(12) United States Patent
Mansson et al.

(10) Patent No.: US 10,946,585 B2
(45) Date of Patent: Mar. 16, 2021

(54) THREE-DIMENSIONAL PRODUCT MANUFACTURING ROBOT FOR PLASTIC FORMABLE MATERIALS

(71) Applicant: Qeestar Co., Ltd., Gyeonggi-do (KR)

(72) Inventors: Jan-Anders Mansson, Puidoux (CH); DaeHwa Ko, Gyeonggi-do (KR)

(73) Assignee: EELCEE LTD.

( * ) Notice: Subject to any disclaimer, the term of this patent is extended or adjusted under 35 U.S.C. 154(b) by 477 days.

(21) Appl. No.: 15/568,997

(22) PCT Filed: Apr. 22, 2016

(86) PCT No.: PCT/KR2016/004230
§ 371 (c)(1),
(2) Date: Oct. 24, 2017

(87) PCT Pub. No.: WO2016/175512
PCT Pub. Date: Nov. 3, 2016

(65) Prior Publication Data
US 2018/0126652 A1    May 10, 2018

(30) Foreign Application Priority Data
Apr. 28, 2015   (KR) .................. 10-2015-0059668

(51) Int. Cl.
*B29C 64/379*   (2017.01)
*B29C 70/24*   (2006.01)
(Continued)

(52) U.S. Cl.
CPC ........... *B29C 64/379* (2017.08); *B25J 11/005* (2013.01); *B25J 19/0025* (2013.01);
(Continued)

(58) Field of Classification Search
CPC ... B29C 64/379; B29C 64/209; B29C 64/118; B29C 70/38
See application file for complete search history.

(56) References Cited

U.S. PATENT DOCUMENTS

| 2001/0003871 A1 | 6/2001 | Patton et al. |
| 2015/0004274 A1 | 1/2015 | Ono |
| 2015/0108677 A1 | 4/2015 | Mark et al. |

FOREIGN PATENT DOCUMENTS

| CN | 102834248 A | 12/2019 |
| EP | 3290189 A1 | 3/2018 |

(Continued)

OTHER PUBLICATIONS

Translation of WO-2011128110A1.*
(Continued)

*Primary Examiner* — Matthew J Daniels
*Assistant Examiner* — Asha A Thomas
(74) *Attorney, Agent, or Firm* — The Belles Group, P.C.

(57) ABSTRACT

A three-dimensional product manufacturing robot using a material constituted by plastic formable materials may be provided that includes: a head supply unit which includes an inlet into which the material is introduced; a transformer unit which includes a plurality of rollers guiding a moving direction of the material transferred from the head supply unit; and a head unit which discharges outwardly the material transferred from the transformer unit. As a result, the tension of a tow, i.e., a raw material can be adaptively controlled and the tow moving within the three-dimensional product manufacturing robot can be prevented from being solidified, cured or degraded. Also, the head unit can rotate precisely within a limited distance. Also, the rotation of the head unit does not accompany the rotation of the tow. That is, while the wheel assembly controls the rotation of the head (Continued)

unit, the tow which passes through the inside of the head unit can be discharged to the outside without rotation.

11 Claims, 14 Drawing Sheets

(51) Int. Cl.
| | |
|---|---|
| *B29C 64/118* | (2017.01) |
| *B29C 64/209* | (2017.01) |
| *B29C 64/241* | (2017.01) |
| *B29C 70/38* | (2006.01) |
| *B29C 64/30* | (2017.01) |
| *B29C 64/321* | (2017.01) |
| *B29C 64/232* | (2017.01) |
| *B25J 11/00* | (2006.01) |
| *B25J 19/00* | (2006.01) |
| *B29C 67/00* | (2017.01) |
| *G05B 19/4099* | (2006.01) |
| *B33Y 40/00* | (2020.01) |
| *B33Y 30/00* | (2015.01) |

(52) U.S. Cl.
CPC .......... *B29C 64/118* (2017.08); *B29C 64/209* (2017.08); *B29C 64/232* (2017.08); *B29C 64/241* (2017.08); *B29C 64/30* (2017.08); *B29C 64/321* (2017.08); *B29C 67/0029* (2013.01); *B29C 70/24* (2013.01); *B29C 70/38* (2013.01); *G05B 19/4099* (2013.01); *B33Y 30/00* (2014.12); *B33Y 40/00* (2014.12)

(56) References Cited

FOREIGN PATENT DOCUMENTS

| | | |
|---|---|---|
| JP | H0462142 A | 2/1992 |
| JP | 6-121945 A | 5/1994 |
| JP | 7-24572 A | 1/1995 |
| JP | 2004017632 | 1/2004 |
| KR | 10-0214153 B1 | 8/1999 |
| KR | 10-2010-0098552 A | 9/2010 |
| WO | WO2011128110 | 10/2011 |
| WO | WO-2011128110 A1 * | 10/2011 ............. B29B 11/16 |

OTHER PUBLICATIONS

Supplemental Partial European Search Report dated Nov. 16, 2019.
China Patent Office (CNIPA), Office Action dated Mar. 15, 2019 in related Chinese Appln. No. 2016800239359, pp. 1-9.

* cited by examiner

THREE-DIMENSIONAL PRODUCT MANUFACTURING ROBOT FOR PLASTIC FORMABLE MATERIALS

This application is a National Stage application under 35 U.S.C. §371 of an International application filed on Apr. 22, 2016 and assigned application No. PCT/KR2016/004230, and claims the benefit under 35 U.S.C. §365(b) of a Korean patent application filed on Apr. 28, 2015 in the Korean Intellectual Property Office and assigned Serial No. 10-2015-0059668, the entire disclosure of each of which is hereby incorporated by reference.

BACKGROUND

Field

The present invention relates to a three-dimensional product manufacturing robot using plastic formable materials, and more particularly to a three-dimensional product manufacturing robot capable of freely rotating about multi-axes and of controlling the tensions and temperatures of the plastic formable materials.

Description of Related Art

Recently, a technology for manufacturing an internal reinforcement for reinforcing strength and robustness by using a plastic composite material is being used. Research has been actively devoted to an internal skeleton manufacturing technology such as an additive manufacturing apparatus and internal reinforcement of polymer and composites.

Since the use of the internal skeleton manufacturing technology reduces the amount of the raw material used of a light composite material three-dimensional product and improves the mechanical performance of the light composite material three-dimensional product, the three-dimensional printing or three-dimensional molding becomes popular. In particular, the improvement of the additive manufacturing speed allows the three-dimensional robot technology to function as a part of an automated process.

The additive manufacturing technology has a very high potential value in that it can be used in large variety of industrial fields such as automotive, aircrafts, electronic components, consumer electronics, sporting goods, building materials, etc. However, more research is needed in order to manufacture a sophisticated skeleton structure in a cost efficient manner.

Particularly, the additive manufacturing apparatus which manufactures the internal skeleton uses a thin and continues strand of raw material. The raw material is generally made of a material which is easily solidified, cured or degraded. Therefore, there is a requirement for a technology capable of preventing the raw material from being solidified, cured or degraded until the raw material is discharged to the outside through the inside of the additive manufacturing apparatus.

Also, the additive manufacturing apparatus performs a free trajectory motion (e.g. rotation, rectilinear or curved motion) in order to manufacture shapes having various and complex structures. Here, due to the shape characteristics, there is a problem that the constant tension of the raw material is difficult to maintain while the raw material passes through the additive manufacturing apparatus which is performing extensive articulations. When the tension of the raw material becomes too high, the additive manufacturing apparatus may be out of order. When the tension of the raw material becomes too low, it is difficult to control the discharge speed and position of the raw material.

Disclosed is a bumper beam having a body inside into which the insert reinforcement has been inserted in the Korean Patent No. 10-1198621 (Title: plastic composite bumper beam for vehicle). However, there is no sufficient description of a system for manufacturing the bumper beam into which the insert reinforcement has been inserted. Moreover, a clue for solving the above-described problems cannot be found.

SUMMARY

One embodiment is a three-dimensional product manufacturing robot using a material constituted by plastic formable materials. The robot includes: a head supply unit which includes an inlet into which the material is introduced; a transformer unit which includes a plurality of rollers guiding a moving direction of the material transferred from the head supply unit; and a head unit which discharges outwardly the material transferred from the transformer unit.

Another embodiment is a three-dimensional product manufacturing robot using a material constituted by plastic formable materials. The robot includes: a head supply unit which includes an inlet into which the material is introduced; a transformer unit which includes a plurality of rollers guiding movement of the material transferred from the head supply unit; and a head unit which includes a head heater preventing the material transferred from the transformer unit from being solidified, cured or degraded.

Further another embodiment is a three-dimensional product manufacturing robot using a material constituted by plastic formable materials. The robot includes: a head supply unit which includes an inlet into which the material is introduced; a transformer unit which includes a plurality of rollers guiding movement of the material transferred from the head supply unit; and a head unit which discharges outwardly the material transferred from the transformer unit. The head unit includes a wheel assembly which enables the head unit to perform a multiple rotation.

DETAILED DESCRIPTION

Figure 1:
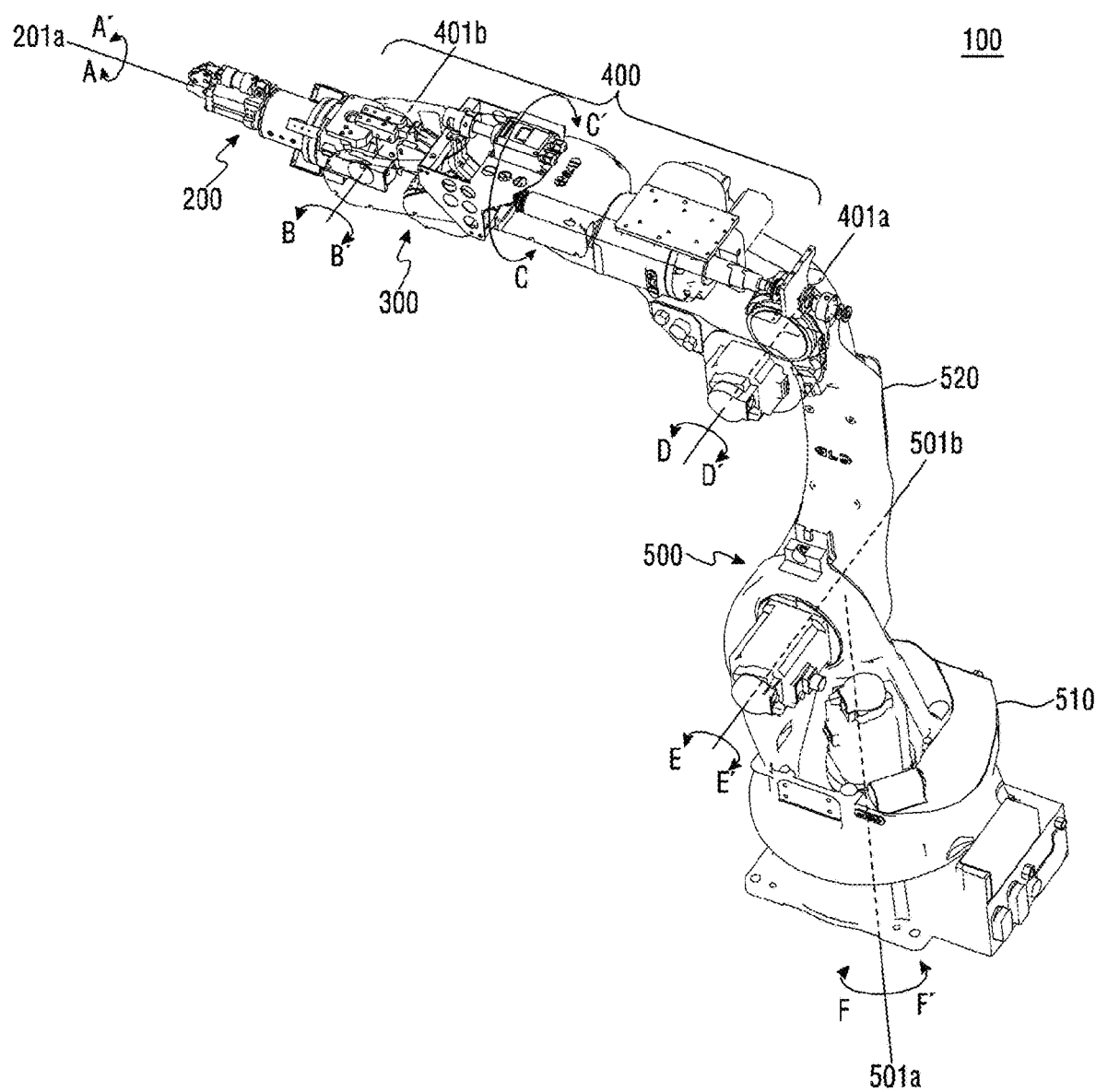
FIG. 1 is a perspective view of a three-dimensional product manufacturing robot 100 according to an embodiment of the present invention.

Specific embodiments of the present invention will be described in detail with reference to the accompanying drawings. The specific embodiments shown in the accompanying drawings will be described in enough detail that those skilled in the art are able to embody the present invention. Other embodiments other than the specific embodiments are mutually different, but do not have to be mutually exclusive. Additionally, it should be understood that the following detailed description is not intended to be limited.

The detailed descriptions of the specific embodiments shown in the accompanying drawings are intended to be read in connection with the accompanying drawings, which are to be considered part of the entire written description. Any reference to direction or orientation is merely intended for convenience of description and is not intended in any way to limit the scope of the present invention.

Specifically, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation.

Terms such as "attached," "affixed," "connected," "coupled," "interconnected," and similar refer to a relationship wherein structures are attached, connected or fixed to one another either directly or indirectly through intervening structures, as well as both movable or rigid attachments or relationships, unless expressly described otherwise.

Figure 2:
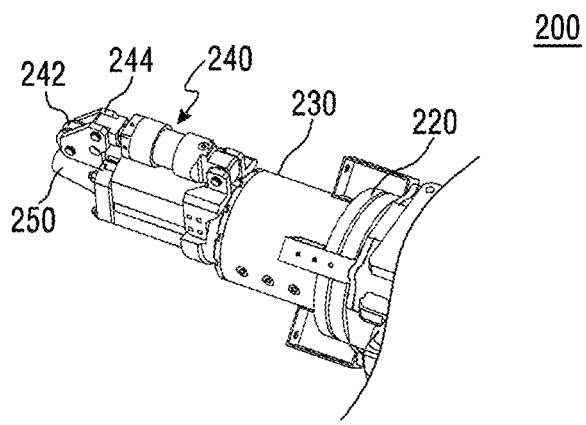
FIG. 2 is a perspective view of a head unit 200 which is a component of the three-dimensional product manufacturing robot 100 according to the embodiment of the present invention.
Figure 3:
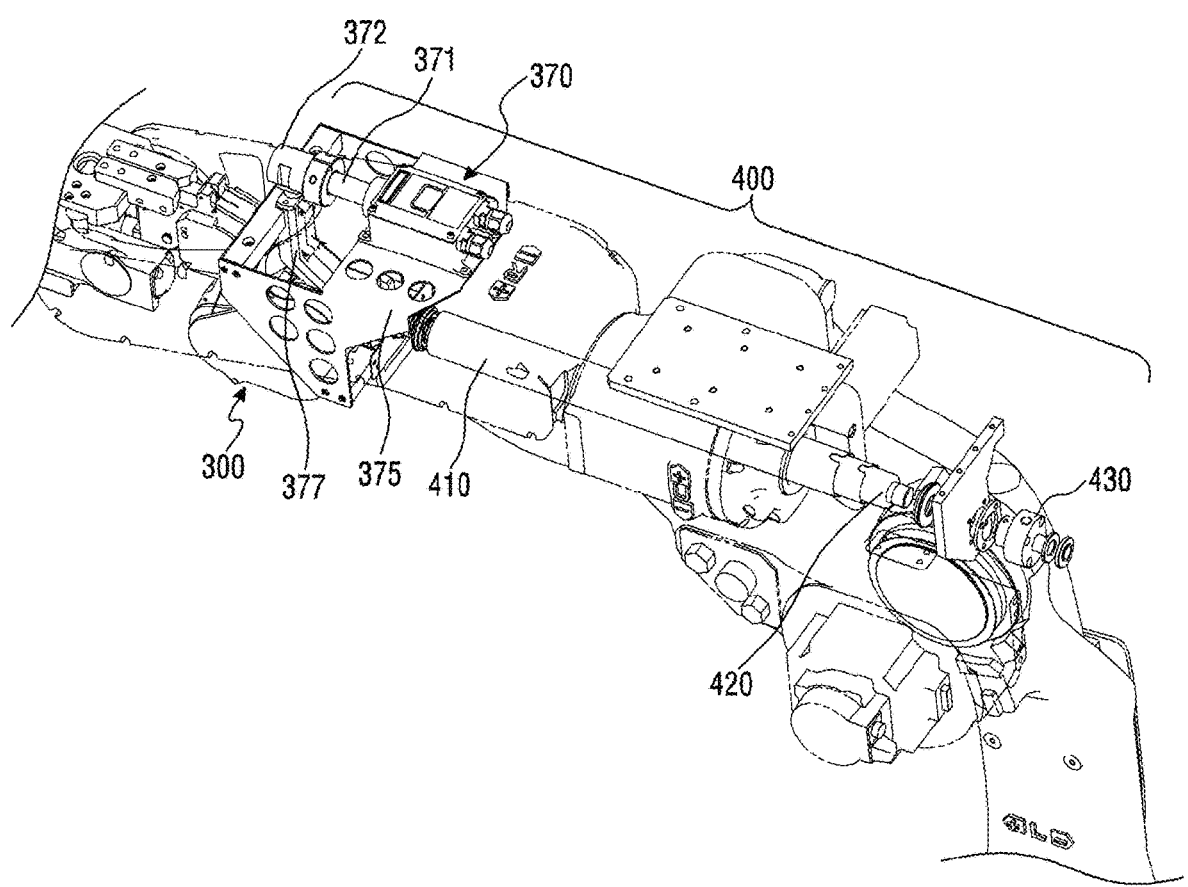
FIG. 3 is a perspective view of a transformer unit 300 and a head supply unit 400 which are components of the three-dimensional product manufacturing robot 100 according to the embodiment of the present invention.

FIG. 1 is a perspective view of a three-dimensional product manufacturing robot 100 according to an embodiment of the present invention. FIG. 2 is a perspective view of a head unit 200 which is a component of the three-dimensional product manufacturing robot 100 according to the embodiment of the present invention. FIG. 3 is a perspective view of a transformer unit 300 and a head supply unit 400 which are components of the three-dimensional product manufacturing robot 100 according to the embodiment of the present invention.

As shown in FIG. 1, the three-dimensional product manufacturing robot 100 according to the embodiment of the present invention includes the head unit 200, the transformer unit 300, the head supply unit 400, and a body unit 500.

First, the body unit 500 includes a rotation base 510 and a connection arm 520. The rotation base 510 performs a rotational motion (F-F') on a horizontal plane about a rotational axis 501$a$. One end of the connection arm 520 is connected to the rotation base 510. The other end of the connection arm 520 is connected to the head supply unit 400.

The connection arm 520 and the head supply unit 400 may be connected to each other by means of a member which is rotatable, for example, a pivot hinge, a shaft, etc. Also, the connection arm 520 and the rotation base 510 may be connected to each other by means of a member which is rotatable, for example, a pivot hinge, a shaft, etc. However, there is no limit to this.

More specifically, one end of the connection arm 520 is rotatably connected with respect to the rotation base 510. The connection arm 520 performs a rotational motion (E-E') about a connection axis 501$b$ of an interconnection portion between the connection arm 520 and the rotation base 510.

The other end of the connection arm 520 is rotatably connected with respect to the head supply unit 400. The connection arm 520 is a longitudinal member and adjusts the height of the head supply unit 400 from the horizontal plane.

That is to say, the head supply unit 400 performs a rotational motion (D-D') about a connection axis 401$a$ of an interconnection portion between the connection arm 520 and the head supply unit 400.

The head supply unit 400 performs a rotational motion (C-C') about a longitudinal axis. Here, as the head supply unit 400 rotates, the transformer unit 300 and the head unit 200 which have been connected to the head supply unit 400 rotates in association with the rotation of the head supply unit 400.

Also, the head unit 200 is connected with respect to the head supply unit 400. The head unit 200 is connected to a head fastener 440 provided on the head supply unit 400. The head unit 200 performs a rotational motion (B-B') about a connection axis 401$b$ of an interconnection portion between the head unit 200 and a head fastener 440.

Specifically, the rotational motion (B-B') of the head unit 200 is controlled by a below-described operation of the transformer unit 300. That is, the head unit 200 is connected to the transformer unit 300, and the head unit 200 and the transformer unit 300 face each other with respect to the connection axis 401$b$. Here, the head unit 200 and the transformer unit 300 perform the vertical rotational motion (B-B') in an opposite direction to each other (for example, when a portion of the transformer unit 300 descends, the head unit 200 ascends, and when the portion of the transformer unit 300 ascends, the head unit 200 descends).

The head unit 200 performs a 360 degree rotational motion (A-A') about a longitudinal axis 201$a$ thereof. A wheel assembly enables the head unit 200 to perform a multiple rotation (360°, 720° . . . ). Here, a spacer may be provided on the head unit 200 so as to prevent electric wires included in the head unit 200 from being affected by the rotation of the head unit 200.

As described above, the three-dimensional product manufacturing robot 100 according to the embodiment of the present invention may rotate about multi-axes. It has been described that the three-dimensional product manufacturing robot 100 can rotate about six axes. However, when the three-dimensional product manufacturing robot 100 includes a tiltable tool table robot to which the rotation base 510 is coupled, the robot 100 can rotate about eight axes.

In other words, the rotation that the three-dimensional product manufacturing robot 100 according to the embodiment of the present invention can perform is as follows:

The first axis rotation: the rotation of the head unit 200 about the longitudinal axis 201$a$ (A-A')

The second axis rotation: the rotation of the head unit 200, which is controlled by the transformer unit 300 (B-B')

The third axis rotation: the rotation of the head supply unit 400 about the longitudinal axis thereof The fourth axis rotation: the rotation of the head supply unit 400 about the connection axis 401a between the head supply unit 400 and the connection arm 520 connected to the head supply unit 400 (D-D')

The fifth axis rotation: the rotation of the connection arm 520 about the connection axis 501b of the rotation base 510 connected to the connection arm 520 (E-E')

The sixth axis rotation: the rotation of the rotation base 510 about the rotational axis 501a perpendicular to the horizontal plane (F-F')

The seventh and eighth axis rotations: the rotation of the tool table (not shown) which is coupled to the rotation base 510 and can rotate about two axes As a result, since the operation of the head unit 200 discharging plastic formable materials can be finely controlled, it is possible to manufacture a three-dimensional product having a more complex and sophisticated shape.

Figure 4:
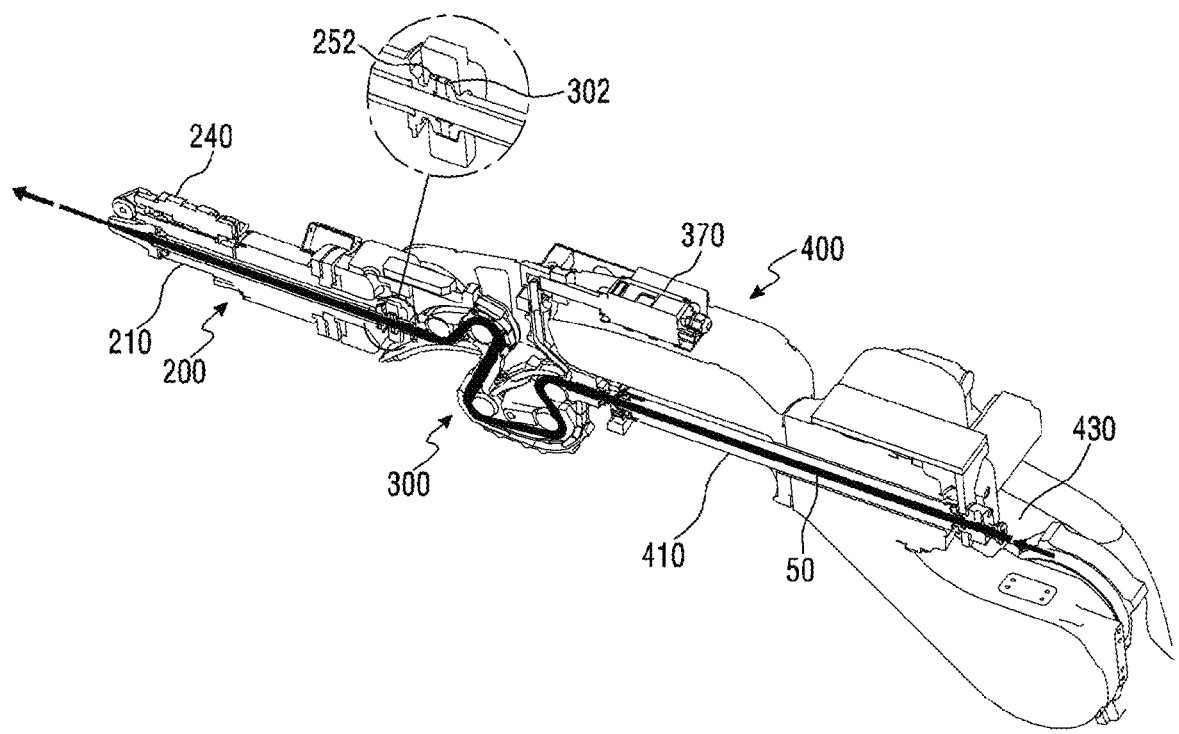
FIG. 4 is a view showing a moving path of a tow of the three-dimensional product manufacturing robot 100 according to the embodiment of the present invention.

FIG. 4 shows the moving path of a tow 50 in the three-dimensional product manufacturing robot 100 according to the embodiment of the present invention. As shown in FIG. 4, the moving path of the tow 50 is formed by an internal passage obtained by the connection of the head unit 200, the transformer unit 300, and the head supply unit 400. As such, the three-dimensional product manufacturing robot 100 according to the embodiment of the present invention has a built-in structure including the moving path of the tow 50, which is formed within the robot 100 by the connection of the head supply unit 400, the transformer unit 300, and the head unit 200.

Here, the tow 50 refers to a continuous strand, yarn, tow, bundle, band, tape made of the polymer material or composite material. The polymer material may include thermoplastics such as PLA, PE, PP, PA, ABS, PC, PET, PEI, PEEK, etc., or thermosetting resins such as Epoxy, Unsaturated Polyester, PI, PUR etc. However, the polymer material is not limited to this. Reinforcing fibers may be Glass Fiber (GF), Carbon Fiber (CF), Aramid Fiber (AF), Natural Fiber (NF) etc. In addition, the three-dimensional product manufacturing robot can be used for textile yarn or roving.

The final composite material is obtained by mixing fiber with the polymer material. The fiber may include glass fiber, carbon fiber, boron fiber, alumina fiber, silicon carbide fiber, aramid fiber, various whiskers, or combinations of the above. However, there is no limit to this.

The manufacturing robot 100 is initially charged with yarn, tow, strand, band or tape. The individual yarn, tow, strand, band or tape is partly or fully consolidated together to a tow in an oven (containing collector, IR-heater, compactor). The head supply unit 400, transformer unit 300, head unit 200 and a lay-up roller is providing additional final consolidation and compaction of the tow.

Also, the yarn, strand, tow, band or tape, etc., has been taken as an example of the material of the finally manufactured three-dimensional product. However, for the purpose of clearly understanding the present invention, the material of the three-dimensional product will be consistently represented by the tow in the following description.

Referring back to FIG. 4, the moving path of the tow will be described. The tow 50 is introduced through an inlet 430 formed on the end of an inlet pipe 410 of the head supply unit 400. The inlet 430 is provided with the tow 50 from an exteriorly provided tow supplier (not shown). Also, the three-dimensional product manufacturing robot 100 according to the embodiment of the present invention may include the tow supplier (not shown).

Also, as will be described below, the inlet 430 is connected to an exteriorly provided heater (not shown) and may be supplied with temperature controlled air. The temperature controlled air supplied through the inlet 430 ensures the tow 50 in the path reaching the inlet 430 having desired temperature and prevents that the tow 50 which passes through the inside of the three-dimensional product manufacturing robot 100 according to the embodiment of the present invention is solidified, cured or degraded.

The tow 50 which has passed through the inlet 430 passes by the inlet pipe 410 and enters the transformer unit 300.

Here, since the head supply unit 400 includes a head supply heater 420 inside the inlet pipe 410, the tow 50 can continue to move to the transformer unit 300 in an unsolidified, uncured or undegraded state while passing by the inlet pipe 410.

As will be described in more detail below, the transformer unit 300 includes a plurality of rollers. The plurality of rollers guide the movement of the tow 50. The tow 50 which has entered the transformer unit 300 through the head supply unit 400 changes the moving direction with a contact with each of the rollers. That is, the moving path of the tow 50 is determined by the structure or arrangement of the plurality of rollers.

Meanwhile, the arrangement of the plurality of rollers is changed while the transformer unit 300 which rotates the head unit 200 controls the rotation of the head unit 200. As a result, the moving direction of the tow 50 is changed and the tension of the tow 50 is also affected.

Here, at least one of the plurality of rollers is designed in such a way as to maintain the constant tension of the tow 50, which may be changed by the movement of the tow 50. Specifically, at least one of the plurality of rollers corresponds to a roller for maintaining the tension of the tow 50. The remaining rollers other than the tension maintaining roller not only guide the movement of the tow but also involve the rotation of the head unit 200. This will be described later in more detail with reference to FIGS. 9 to 14.

The tow 50 which has passed through the transformer unit 300 continues to move toward the head unit 200. A coupling 302 is provided on the front end of the transformer unit 300. The coupling 302 is connected to a coupling 252 located on the head unit 200. Here, the coupling 302 of the transformer unit 300 and the coupling 252 of the head unit 200 may be directly connected to each other or may be indirectly connected to each other by means of an appropriate connection member.

The tow 50 which has entered the inside of the head unit 200 passes through a head pipe 212 of the head unit 200 and then is discharged to the outside. Here, the longitudinal and cylindrical head pipe 212 is surrounded by a head heater 214. The head heater 214 of the head unit 200 causes the head pipe 212 to maintain a controlled temperature, and thus, prevents that the tow 50 which is passing through the inside of the head pipe 212 is solidified, cured or degraded.

As described above, the three-dimensional product manufacturing robot 100 according to the embodiment of the present invention may include the plurality of heaters in order to prevent the tow 50 from being solidified, cured or degraded. However, when the tow 50 is discharged from the three-dimensional product manufacturing robot 100, it is necessary to accurately control the temperature of the tow 50. This is to ensure an optimal discharge rate and positioning as well as to prevent the solidification and adherence to a substrate to which the tow is discharged.

In order to prevent this, the head unit 200 includes a temperature regulated forced air pipe 246 for controlling the temperature of the tow 50 which is discharged to the outside. The forced air pipe 246 either directly or indirectly maintains the tow 50 at a desired temperature. The tow 50 having its temperature controlled by the forced air pipe 246 can be discharged from the unit head 200 without adhering. This will be described below in more detail with reference to FIG. 5 related to the head unit 200.

The controlled temperature of the tow 50 will be accepted so long as it can be interpreted as a temperature or temperature range which enables the tow 50 to be discharged without adhering and/or enables a required discharge rate.

The three-dimensional product manufacturing robot 100 according to the embodiment of the present invention is not limited to a specific temperature or a specific temperature range which is controlled by the heater (head heater 214 or head supply heater 420) or forced air pipe 246. In other words, depending on the material or properties of the tow 50, the three-dimensional product manufacturing robot 100 is only required to have an ability to control (increase, decrease or maintain) the temperature of the tow 50, or to maintain the temperature of the tow 50.

Hereafter, the detailed structures and operations of the head unit 200 and the transformer unit 300 of the three-dimensional product manufacturing robot 100 according to the embodiment of the present invention will be described.

Figure 5:
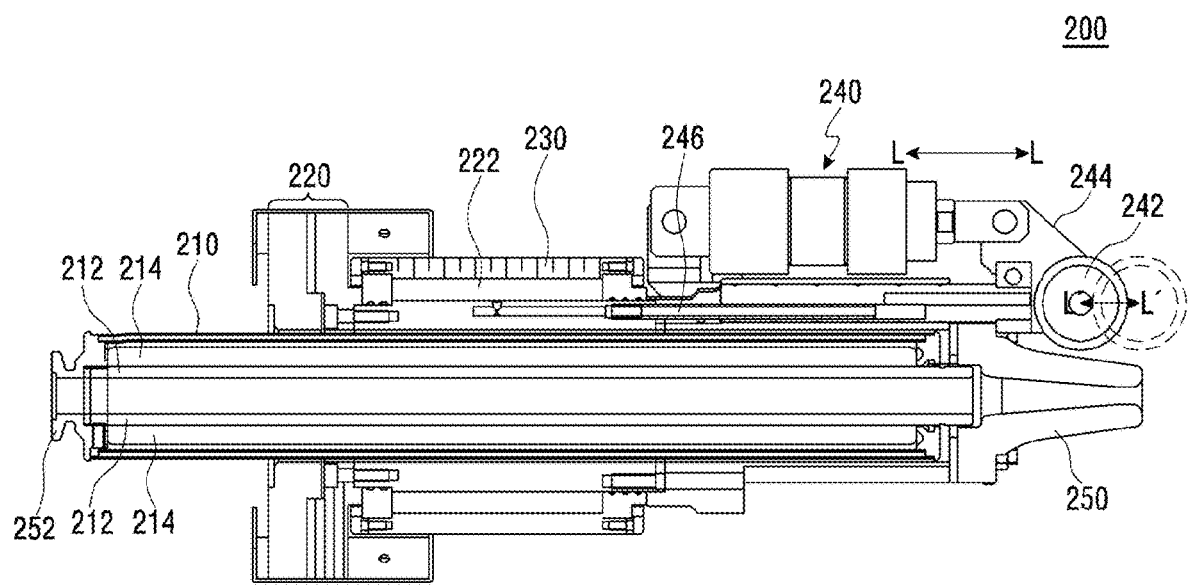
FIG. 5 is a cross sectional view of the head unit 200 which is a component of the three-dimensional product manufacturing robot 100 according to the embodiment of the present invention.

FIG. 5 is a cross sectional view of the head unit 200 which is a component of the three-dimensional product manufacturing robot 100 according to the embodiment of the present invention. As shown in FIG. 5, the head unit 200 includes a head body 210 including the head pipe 212 and the head heater 214, a wheel assembly 220, a spacer 222, a rotary housing 230, a cylinder assembly 240, a discharge port 250, and the coupling 252. Here, the cylinder assembly 240 includes a cylinder roller 242, a cylinder roller bracket 244, and the forced air pipe 246.

The above configuration is just included in the exemplary embodiment of the present invention. So long as the above-listed configuration is able to maintain the functions of the three-dimensional product manufacturing robot 100 according to the embodiment of the present invention, other configurations other than the above-listed configuration can be added, or some of the above-listed configuration can be omitted.

The head body 210 includes the longitudinal and cylindrical head pipe 212. The head body 210 guides the movement of the tow 50 which has passed through the transformer unit 300 and has entered the head unit 200.

The head heater 214 surrounds the entire or partial head pipe 212 and increases the temperature of the pipe 212. The tow 50 which is passing through the head pipe 212 is prevented from being solidified, cured or degraded because the tow 50 passes through the inside of the head pipe 212 heated by the head heater 214. As a result, the tow 50 is smoothly discharged to the outside without adhering to the inside of the head pipe 212.

The wheel assembly 220 is provided at a predetermined position of the head body 210. Preferably, as shown in FIG. 5, the wheel assembly 220 is provided close to the end opposite to the discharge port 250 of the head unit 200.

The wheel assembly 220 allows the head unit 200 to perform a multiple rotation (360°, 720° . . . ). That is, the wheel assembly 220 is comprised of a wheel, a flange, and a gasket, etc., and rotates the head body 210.

Here, internal electric wires provided within the head unit 200 may be affected by the rotation of the head body 210. In order to prevent this, the head unit 200 may include the rotary housing 230 and the spacer 222.

That is, the rotary housing 230 includes at least one spacer 222 therewithin. The wires are disposed in a space spaced by the spacer 222, so that only the head body 210 itself is rotated without being affected by the wire (twist, disconnection, etc.).

Figure 6:
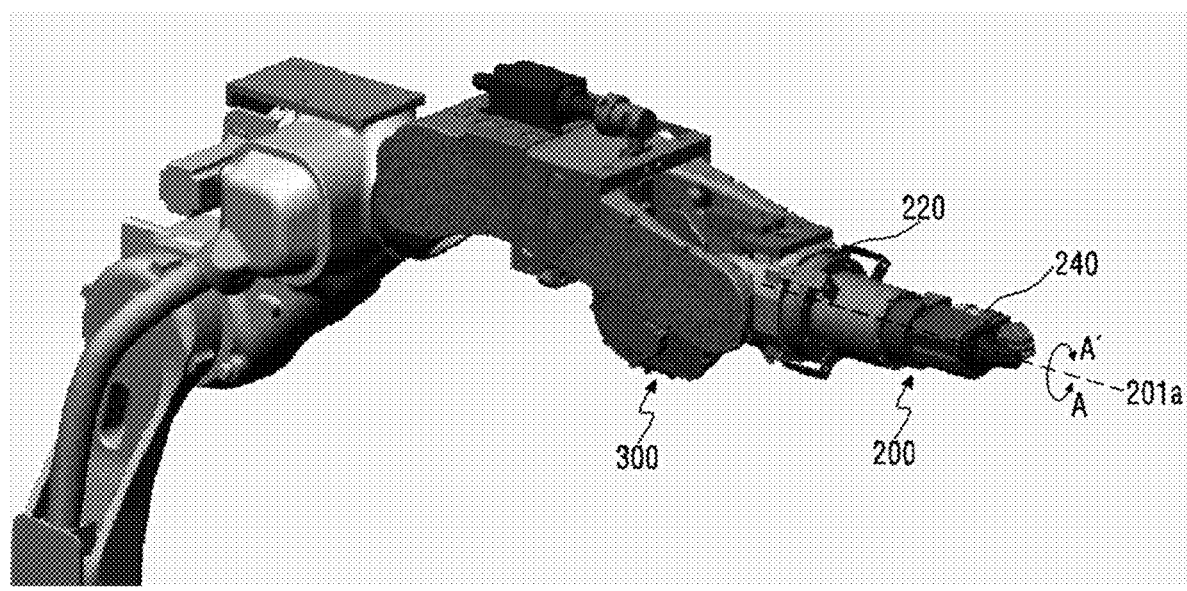
FIGS. 6 to 8 are views showing the rotation of the head unit 200 which is a component of the three-dimensional product manufacturing robot 100 according to the embodiment of the present invention.
Figure 7:
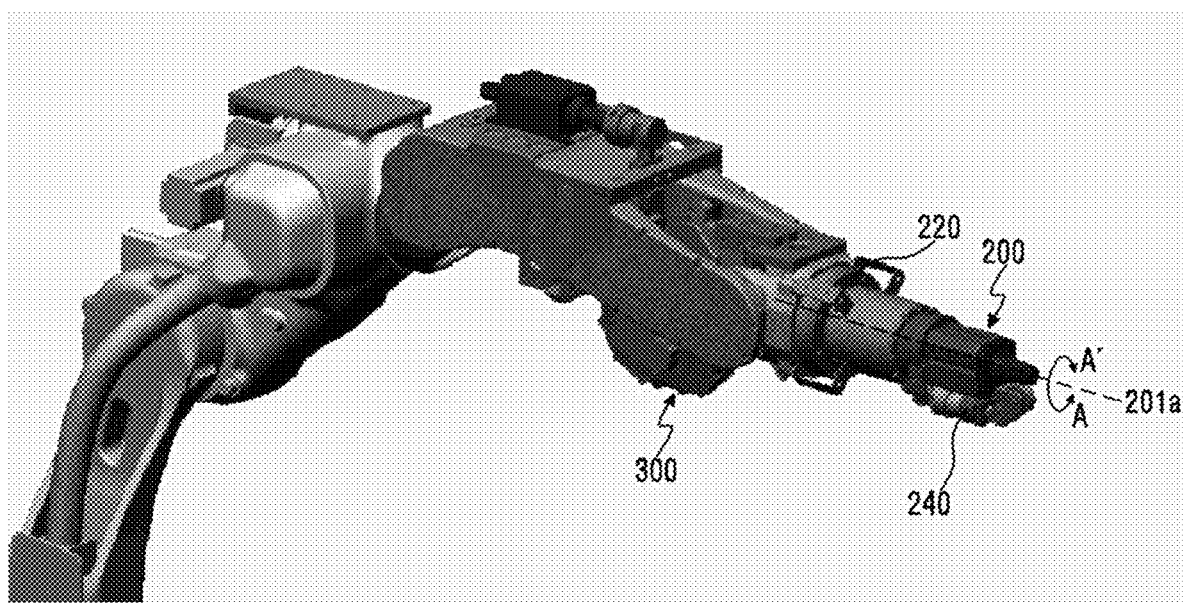
Figure 8:
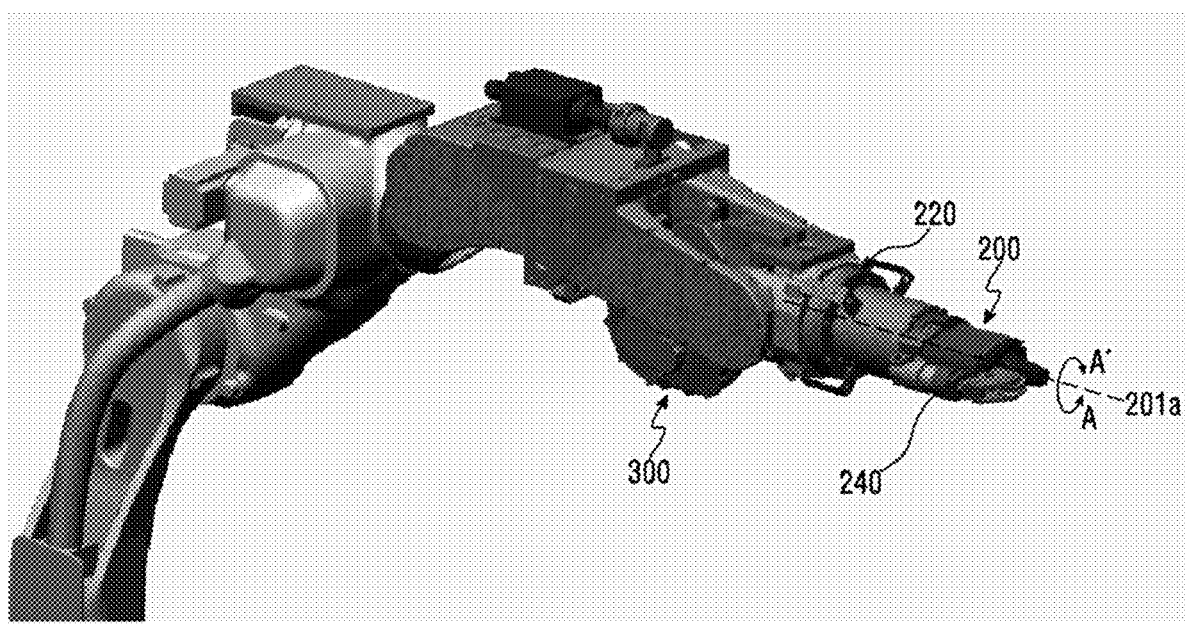

Due to the wheel assembly 220, the head unit 200 performs a rotational motion (A-A') about the longitudinal axis 201a. FIGS. 6 to 8 are views showing the rotation of the head unit 200 by the wheel assembly 220.

As shown in FIGS. 6 to 8, the head unit 200 performs a multiple rotation (360°, 720° . . . ) by means of the wheel assembly 220 without the help of the transformer unit 300 or head supply unit 400. As described above, due to the rotary housing 230 and the spacer 222, the internal electric wires are not affected by the rotation.

Also, the rotation of the head unit 200 does not accompany the rotation of the tow 50. That is, while the wheel assembly 220 controls the rotation of the head unit 200, the tow 50 which passes through the inside of the head unit 200 may be discharged to the outside without rotation.

As such, the rotation of the head unit 200 helps to more precisely manufacture the three-dimensional product having various shapes and structures.

The cylinder assembly 240 is fixed to a portion of the head body 210. Preferably, the cylinder assembly 240 is located adjacent to the discharge port 250 through which the tow 50 is discharged.

The cylinder assembly 240 linearly reciprocates the cylinder roller bracket 244 by using the reciprocating action of an internal piston. Accordingly, the cylinder roller bracket 244 performs a linear reciprocating action (L-L') along the longitudinal direction of the head unit 200.

Meanwhile, the cylinder roller 242 is provided on one end of the cylinder roller bracket 244. The cylinder roller 242 has a function to precisely guide the tow 50 which is discharged.

When the cylinder roller bracket 244 performs the linear reciprocating action (L-L'), the cylinder roller 242 provided on one end of the cylinder roller bracket 244 also performs the linear reciprocating action (L-L').

The tow 50 which has passed through the head pipe 212 and has been discharged through the discharge port 250 is guided by the cylinder roller 242. That is, the cylinder roller 242 guides appropriately the position of the tow 50 which is discharged to the outside.

If the cylinder roller 242 is not provided, the tow 50 descends immediately by gravity or adheres to the discharge port 250, so that it is difficult to discharge the tow 50 to a desired position. However, when the final discharge moving path of the tow 50 is guided by the cylinder roller 242, the tow 50 can be precisely discharged to the desired position. Therefore, it is possible to manufacture the three-dimensional product having a more complicate shape by using the plastic formable materials.

Meanwhile, the cylinder assembly 240 includes the forced air pipe 246. As described above, the forced air pipe 246 controls either directly or indirectly the temperature of the tow 50 which is discharged.

The forced air pipe 246 included in the cylinder assembly 240 controls the temperature of the components of the cylinder assembly 240, i.e., the internal piston (not shown), cylinder roller bracket 244, and cylinder roller 242.

Particularly, the forced air pipe 246 controls the temperature of the cylinder roller 242 contacting with the end thereof and the temperature of the tow 50 which is guided by the cylinder roller 242.

More specifically, when the cylinder roller 242 moves forward (in the moving direction of the tow 50) in accordance with the internal piston movement of the cylinder assembly 240, the final discharge direction of the tow 50 which has passed through the head pipe 212 of the head unit 200 and has been discharged through the discharge port 250 is guided with a contact with the cylinder roller 242.

Here, the temperature of the tow 50 is appropriately controlled while in contact with the cylinder roller 242 having a temperature controlled by the forced air pipe 246.

Describing again, since the tow 50 which is discharged through the discharge port 250 does not free fall and the moving path of the tow 50 is guided by the cylinder roller 242, the tow 50 can be precisely discharged to the desired position and the tow 50 of which the temperature has been controlled by the forced air pipe 246 can be smoothly discharged without adhering to the discharge port 250 or cylinder roller 242.

Figure 9:
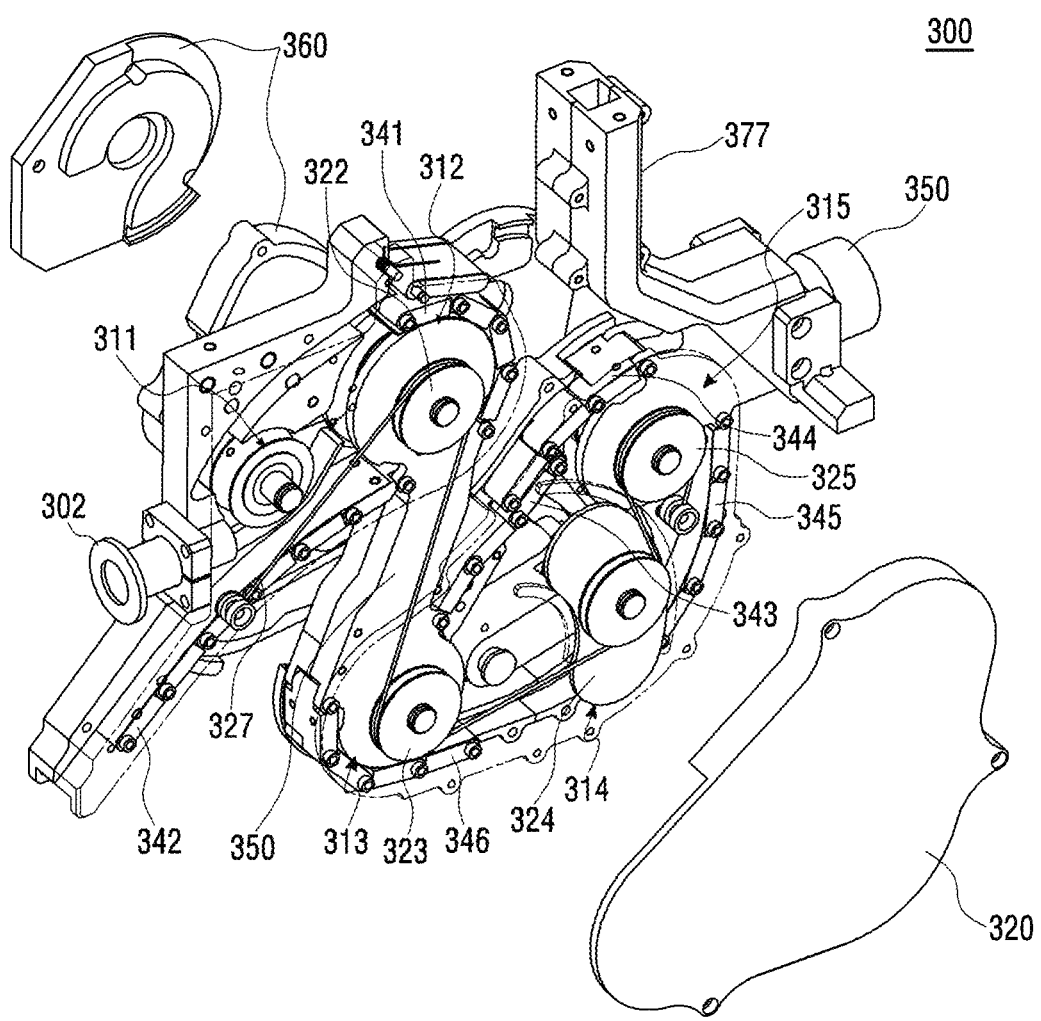
FIG. 9 is a right exploded perspective view of the transformer unit 300 which is a component of the three-dimensional product manufacturing robot 100 according to the embodiment of the present invention.
Figure 10:
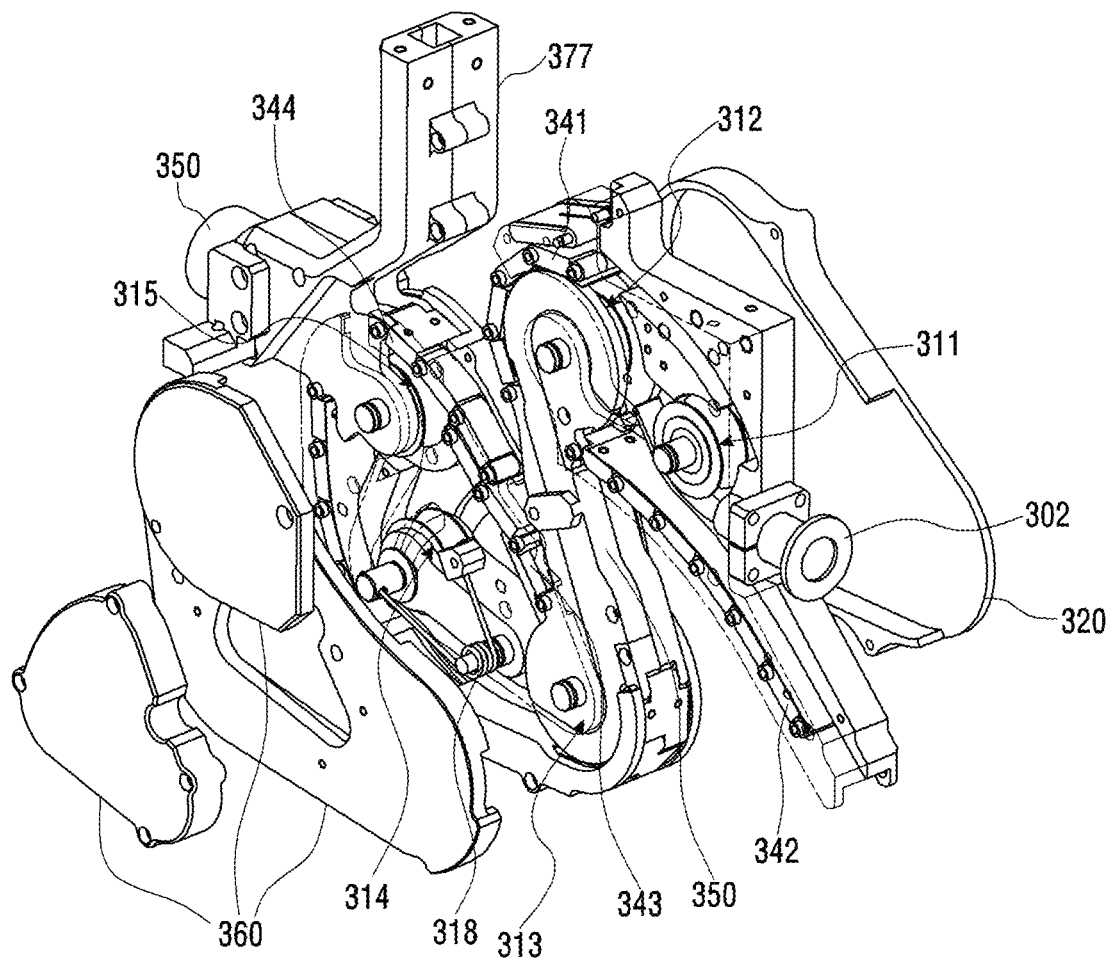
FIG. 10 is a left exploded perspective view of the transformer unit 300 which is a component of the three-dimensional product manufacturing robot 100 according to the embodiment of the present invention.
Figure 11:
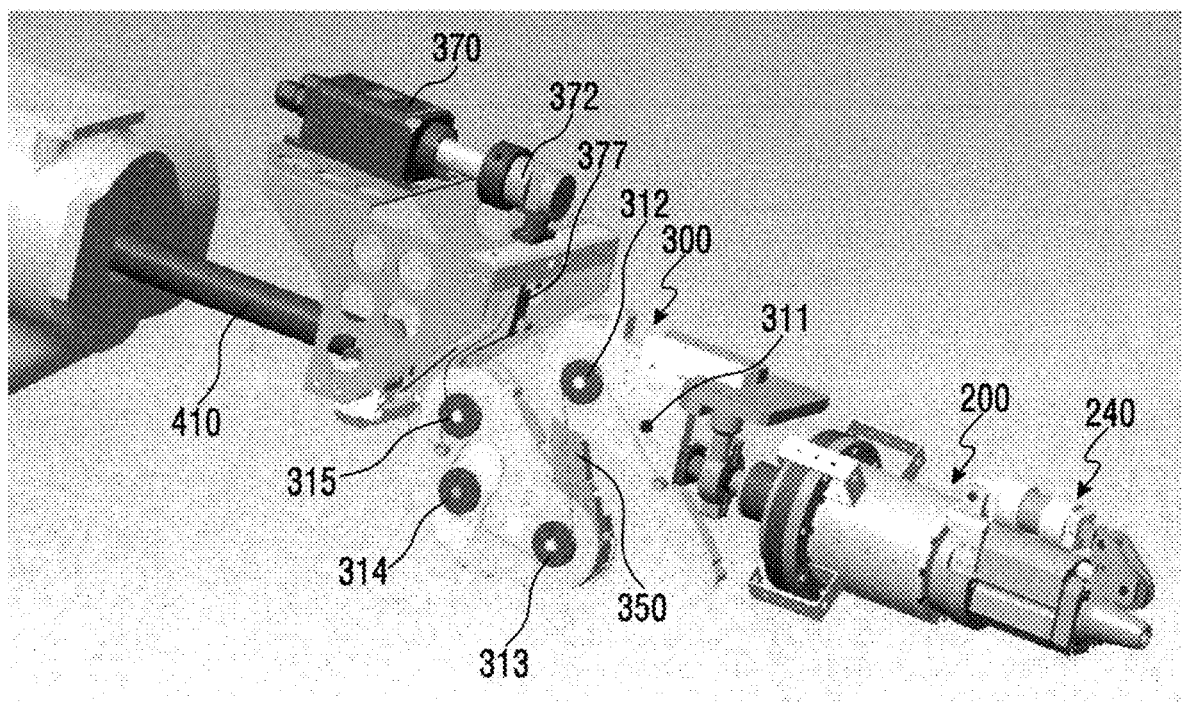
FIG. 11 is a schematic view of the transformer unit 300 which is a component of the three-dimensional product manufacturing robot 100 according to the embodiment of the present invention.

Hereafter, the structure and operation of the transformer unit 300 will be described. FIG. 9 is a right exploded perspective view of the transformer unit 300 which is a component of the three-dimensional product manufacturing robot 100 according to the embodiment of the present invention. FIG. 10 is a left exploded perspective view of the transformer unit 300 which is a component of the three-dimensional product manufacturing robot 100 according to the embodiment of the present invention. FIG. 11 is a schematic view of the transformer unit 300 which is a component of the three-dimensional product manufacturing robot 100 according to the embodiment of the present invention.

First, as shown in FIG. 9, the transformer unit 300 includes the plurality of rollers. It is assumed that the total of five rollers are included in the transformer unit 300 in the embodiment. However, the transformer unit 300 may include a smaller number than five of the rollers in another embodiment, and the transformer unit 300 may include a larger number than five of the rollers in further another embodiment.

FIG. 9 is a right exploded perspective view of the transformer unit 300 and shows in detail the right sides of a first to a fifth rollers 311 to 315 included in the transformer unit 300

At least two of the first to fifth rollers 311 to 315 are connected by means of a wire 327, so that a constant distance between the first to fifth rollers 311 to 315 is maintained. As a result, the moving path of the tow 50, which is formed in the first to fifth rollers 311 to 315, can be maintained to have a constant length.

In other words, the first to fifth rollers 311 to 315 define the moving path of the tow 50. As a constant distance between the first to fifth rollers 311 to 315 is maintained, the structural stability of the transformer unit 300 can be obtained and the length of the entire tow 50 passing through the transformer unit 300 becomes constant.

In the embodiment, the wire 327 is fastened to wire catching portions 322 to 325 located on the right side of the second to fifth rollers 312 to 315, and thus, the length of each roller becomes constant or the tension between the rollers is maintained.

Meanwhile, the shapes of a first to a sixth chains 341 to 346 included in the transformer unit 300 may be changed in accordance with the position changes of the first to fifth rollers 311 to 315.

In the embodiment, the relative position of the second roller 312 with respect to the first roller 311 and the relative position of the first roller 311 with respect to the second roller 312 are constant. That is, between the first roller 311 and the second roller 312, the arrangement with respect to each other (spaced distance and angle) is not changed.

Also, the relative position of the fifth roller 315 with respect to the third roller 313 and the relative position of the third roller 313 with respect to the fifth roller 315 are constant. That is, between the third roller 313 and the fifth roller 315, the arrangement with respect to each other (spaced distance and angle) is not changed.

Here, the relative position of the fourth roller 314 positioned between the third roller 313 and the fifth roller 315 is constant with respect to the third roller 313 and the fifth roller 315. However, when the fourth roller 314 operates as the tension control roller, the position of the fourth roller 314 is variable within a predetermined range.

As a result, it can be described that the first roller 311 and the second roller 312 move as one unit, and the first to fifth rollers 313 to 315 also move as one unit.

Meanwhile, the second roller 312 and the third roller 313 are connected to each other by a connection member 350.

A portion of the transformer unit 300 rotates about the fifth roller 315, the third and fourth rollers 313 and 314 also rotate while maintaining a constant spaced distance and angle.

Therefore, the position of the second roller 312 connected to the third roller 313 by the connection member 350 is changed.

The position change of the second roller 312 accompanies the position change of the first roller 311 arranged at a constant spaced distance and at an angle.

The position changes of the first and second rollers 311 and 312 pursuant to the rotation of the fifth roller 315 causes the movement of the head unit 200. This is because the coupling 252 of the head unit 200 is connected to the coupling 302 of the transformer unit 300, and the coupling 302 of the transformer unit 300 is fixed near the first roller 311. That is, the distance and arrangement angle between the first roller 311 and the coupling 302 of the transformer unit 300 are constant.

Also, since the head unit 200 is connected to the head fastener 440 of the head supply unit 400, the head unit 200 and a portion of the transformer unit 300 (portion where the first roller 311 and the second roller 312 are positioned) perform a relative motion with respect to the connection axis 401b between the head fastener 440 and the head unit 200.

Referring to the principle of leverage, the connection axis 401b between the head fastener 440 and the head unit 200 functions as a fulcrum, the portion where the first roller 311 of the transformer unit 300 is located functions as an effort, and the head unit 200 functions as a load.

When the portion where the first roller 311 of the transformer unit 300 is located ascends, the head unit 200 descends, and when the portion where the first roller 311 of the transformer unit 300 is located descends, the head unit 200 ascends.

Here, the length of the head fastener 440 is constant and the transformer unit 300 controlling the operation of the head unit 200 is located within the head fastener 440. Therefore, the transformer unit 300 according to the embodiment of the present invention is provided within a limited distance (the length of the head fastener 400) and ensures the movement of the head unit 200, so that the three-dimensional product manufacturing robot 100 can have a more compact configuration.

Figure 12:
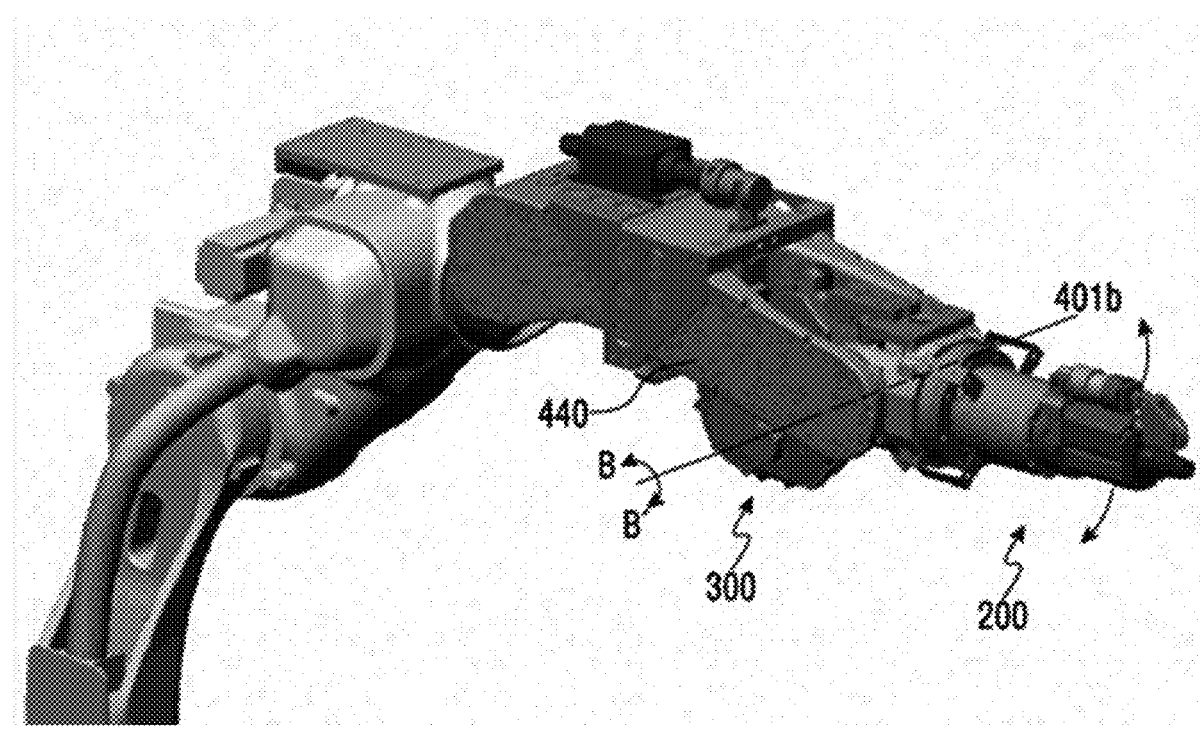
FIGS. 12 to 14 are views showing the rotation of the head unit 200 according to the operation of the transformer unit 300.
Figure 13:
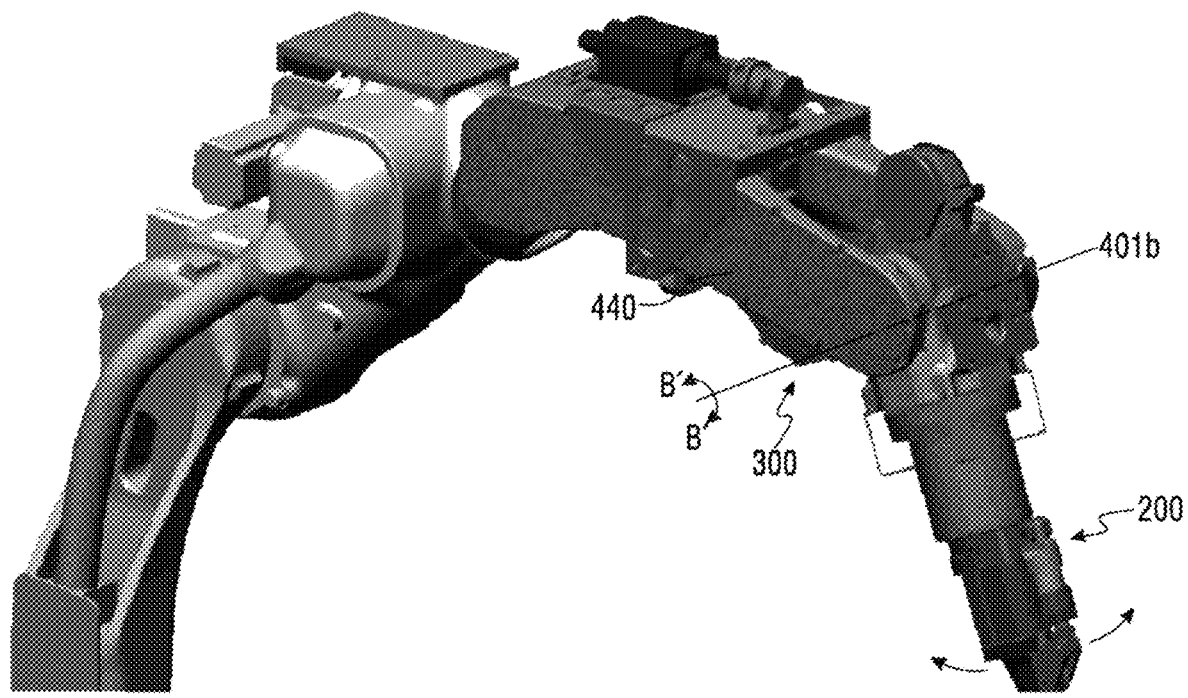
Figure 14:
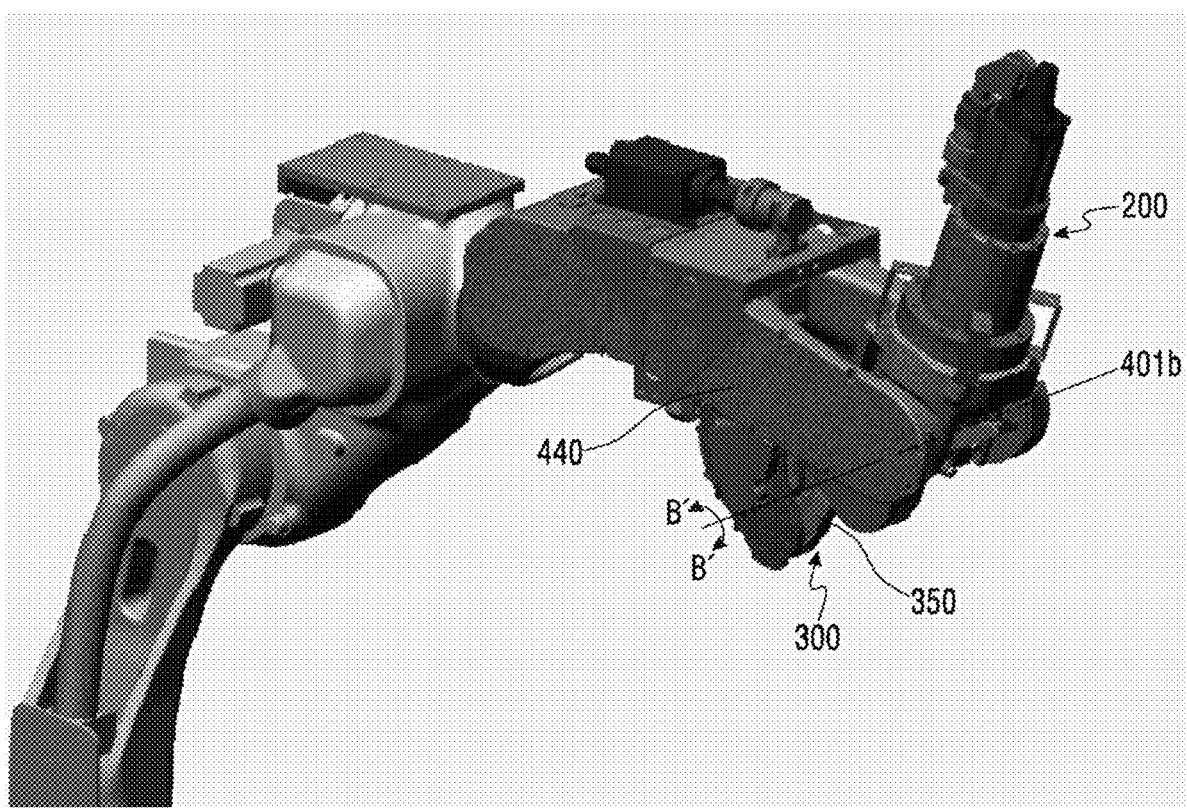

FIGS. 12 to 14 show the movement or rotation of the head unit 200 by the transformer unit 300.

FIG. 12 shows that the configuration of the transformer unit 300 has been placed at the positions shown in FIG. 11. Here, the head unit 200 is placed on an extension line in a direction almost parallel with a horizontal plane, that is, in the longitudinal direction of the head supply unit 400.

FIG. 13 shows that a portion of the transformer unit 300, which includes the fifth roller 315, rotates about the fifth roller 315.

The rotation of the portion of the transformer unit 300 about the fifth roller 315 causes the connection member 350 which connects the third roller 313 with the second roller 312 to ascend. Accordingly, the head unit 200 opposite to the transformer unit 300 with respect to the connection axis 401b descends.

FIG. 14 shows that a portion of the transformer unit 300, which includes the fifth roller 315, rotates in an opposite direction to that of FIG. 13.

The rotation of the portion of the transformer unit 300 about the fifth roller 315 pulls downward the connection member 350 connecting the third roller 313 with the second roller 312. Accordingly, the head unit 200 opposite to the transformer unit 300 with respect to the connection axis 401b ascends.

As such, since the transformer unit 300 can be transformed in a limited space by using the plurality of rollers 311 to 315, it can rotate the head unit 200. Therefore, the three-dimensional product manufacturing robot 100 can have a more compact configuration.

According to the embodiment, the transformer unit 300 can cause the head unit 200 to freely rotate at a more than 160 degree. It goes without saying that the transformer unit 300 can also rotate the head unit 200 at a greater angle in accordance with the arrangement of the rollers 311 to 315 or the length of the head fastener 440, etc.

Hereafter, in the three-dimensional product manufacturing robot 100 according to the embodiment of the present invention, the adaptive tension control function of the tow 50 passing through the transformer unit 300 will be described in detail.

Here, at least one of the first to fifth rollers 311 to 315 functions as a tension control roller which adaptively controls the tension of the tow 50 passing through the transformer unit 300.

The embodiment shows that the fourth roller 314 has a function of adaptively controlling the tension of the tow 50. However, it can be considered that other rollers except the fourth roller 314 perform the tension control function or a separate tension control roller is further included.

Each of the rollers 311 to 315 provided on the transformer unit 300 defines the moving path of the tow 50. The tow 50 passes through the inlet pipe 410 and enters the inside of the transformer unit 300 and is guided by the first to fifth rollers 311 to 315, and then moves toward the head unit 200. Here, the tow 50 changes the moving direction with a contact with the first to fifth rollers 311 to 315 of the transformer unit 300.

Here, the tension control roller (fourth roller 314), i.e., one of the plurality of rollers 311 to 315 may include an elastic member 318. Accordingly, due to the elastic member 318, the position of the fourth roller 314 is variable within a predetermined distance.

The position of the fourth roller 314 is moved within the predetermined distance in response to the tension change of the tow 50, which occurs by the transformation of the transformer unit 300, so that the constant tension of the tow 50 may be maintained.

In other words, when the tension of the tow 50 is high, the elastic member 318 allows the fourth roller 314 to move a position where the tension of the tow 50 is decreased, and when the tension of the tow 50 is low, the elastic member 318 allows the fourth roller 314 to move a position where the tension of the tow 50 becomes high.

In the embodiment, the elastic member 318 has been mentioned as a means making it possible to move the position of the fourth roller 314, i.e., the adaptive tension control roller. However, other means except the elastic member 318 can be provided.

Meanwhile, the transformer unit 300 may further include a wire cover 320 and a roller cover 360 which protect components such as each of the rollers 311 to 315, the wire 327, etc.

Hereafter, a heater assembly 370 which is a component of the transformer unit 300 will be described in detail (see FIGS. 3, 9 and 10).

The transformer unit 300 according to the embodiment of the present invention may include the heater assembly 370. The heater assembly 370 generates the temperature controlled air and prevents that the tow 50 passing through the inside of the transformer unit 300 is solidified, cured or degraded.

The temperature controlled air generated by the heater assembly 370 is transferred to the inside of the transformer unit 300 through a heater holder 372 and a heater guider 377.

Specifically, the temperature controlled air transferred through the heater assembly 370 is transferred to the moving path of the tow 50 which passes through the transformer unit 300.

The heater assembly 370 is mounted on a heater plate 375 and can be fixed to the head supply unit 400 in an attachable and detachable manner.

As such, the temperature controlled air which is supplied to the moving path of the tow 50 causes the tow 50 which passes through the transformer unit 300, i.e., a component of the three-dimensional product manufacturing robot 100 according to the embodiment of the present invention to maintain the controlled temperature. Accordingly, it is possible to prevent the tow 50 from being solidified, cured or degraded.

The configuration capable of preventing the tow 50 from being solidified, cured or degraded includes not only the heater assembly 370 but also an external heater (not shown) connected to the inlet 430 of the head supply unit 400, the head supply heater 420 of the head supply unit 400, and the head heater 214 of the head unit 200. These heating devices prevent the tow 50 from being solidified, cured or degraded.

Also, the temperature of the tow 50 is controlled by the forced air pipe 246 included in the head unit 200, so that the tow 50 can be discharged to the outside at the controlled temperature without adhering to the equipment devices but still at a temperature promoting adherence to a previously discharged tow on the lay-up tool, if so is desired.

Meanwhile, each of the rollers 311 to 315 of the transformer unit 300 may further include a motor (not shown). This has a function of controlling the discharge rate and discharge speed of the tow 50 which is guided by each of the rollers 311 to 315.

The synchronized motor may be individually connected to one or several rollers 311 to 315. A user controls the motor, and thus, determines the rotation speed of each of the rollers 311 to 315. The rotation speed of the rollers 311 to 315 affects directly the moving speed of the tow 50 which is guided by each of the rollers 311 to 315.

In another embodiment, it goes without saying that the motor may be connected to some of the plurality of the rollers 311 to 315.

While the present invention has been described from the viewpoint of the specific embodiment including the exemplary embodiment of the present invention, it can be understood by those skilled in the art that various substitutions and modifications can be made in the above-described configuration of the present invention. Also, structural and functional changes can be variously made without departing from the scope and spirit of the present invention. Therefore, the scope and spirit of the present invention should be construed broadly as described in the claims of the present specification.

REFERENCE NUMERALS

| | |
|---|---|
| 100 three-dimensional product manufacturing robot | 200 head unit |
| 212 head pipe | 214 head heater |
| 220 wheel assembly | 240 cylinder assembly |
| 242 cylinder roller | 250 discharge port |
| 300 transformer unit | 311 to 315 rollers |
| 322 to 325 wire catching portions | 341 to 346 chains |
| 350 connection member | 370 heater assembly |
| 377 heater guider | 400 head supply unit |
| 440 head fastener | 500 body unit |
| 510 rotation base | 520 connection arm |

What is claimed is:

1. A three-dimensional product manufacturing robot using a material constituted by plastic formable materials, the robot comprising:
    a head supply unit which comprises an inlet into which the material is introduced;
    a transformer unit which comprises a plurality of rollers guiding a moving direction of the material transferred from the head supply unit, wherein at least two of the plurality of rollers are connected by a wire, the wire providing a constant distance and a constant tension between the at least two of the plurality of rollers; and
    a head unit which discharges outwardly the material transferred from the transformer unit.

2. The robot of claim 1, wherein the transformer unit changes the arrangement of the plurality of rollers, and thus, controls the movement or rotation of the head unit.

3. The robot of claim 2, further comprising a connection member which connects two rollers of the plurality of rollers.

4. The robot of claim 3, wherein, as a portion of the transformer unit rotates about one of the plurality of rollers, the connection member and the two rollers connected to the connection member move in association with each other, thereby controlling the rotation of the head unit.

5. The robot of claim 1, wherein at least one of the plurality of rollers is a tension control roller of which the position is variable in response to a tension change of the material.

6. The robot of claim 5, wherein the tension control roller comprises an elastic member which enables the tension control roller to move within a predetermined range.

7. The robot of claim 1, wherein the material which is guided by the plurality of rollers maintains a constant length even when the positions of the plurality of rollers are changed.

8. The robot of claim 1, having a built-in structure that a moving path of the material, which is formed by the head supply unit, the transformer unit, and the head unit, is formed within the robot.

9. The robot of claim 1, wherein the material comprises a strand, a yarn, a tow, a bundle, a band or a tape.

10. The robot of claim 1, wherein the robot is configured to perform at least one of
    a rotation of the head unit about the longitudinal axis (first rotation);
    a rotation of the head unit, which is controlled by the transformer unit (second rotation);
    a rotation of the head supply unit 400 about the longitudinal axis thereof (third rotation)
    a rotation of the head supply unit about a connection axis between the head supply unit and a connection arm connected to the head supply unit (fourth rotation);
    a rotation of the connection arm about the connection axis of a rotation base connected to the connection arm (fifth rotation); and
    a rotation of the rotation base about a rotational axis perpendicular to a horizontal plane (sixth rotation).

11. The robot of claim 1, wherein the transformer unit further comprises at least one motor for controlling the rotation speed of at least one of the plurality of rollers.

* * * * *